United States Patent [19]

Richeson et al.

[11] Patent Number: 5,083,533
[45] Date of Patent: Jan. 28, 1992

[54] TWO-STROKE-CYCLE ENGINE WITH VARIABLE VALVE TIMING

[75] Inventors: William E. Richeson; Frederick L. Erickson, both of Fort Wayne, Ind.

[73] Assignee: North American Philips Corporation, New York, N.Y.

[21] Appl. No.: 435,232

[22] Filed: Nov. 9, 1989

[51] Int. Cl.⁵ ............................................. F02B 75/02
[52] U.S. Cl. ............................... 123/65 VC; 123/73 C; 123/90.15
[58] Field of Search ........ 123/65 PE, 65 BA, 65 VC, 123/65 VD, 65 R, 65 A, 73 C, 90.11, 90.15

[56] References Cited

U.S. PATENT DOCUMENTS

| | | | |
|---|---|---|---|
| 2,097,883 | 11/1937 | Johansson | 123/90.15 |
| 2,820,339 | 1/1958 | Grieshaber et al. | 123/65 VC |
| 2,958,315 | 11/1960 | Williams | 123/65 VC |
| 2,991,616 | 7/1961 | Miller | 123/65 VC |
| 3,309,865 | 3/1967 | Kauffmann et al. | 123/65 VC |
| 3,911,873 | 10/1975 | Dave | 123/90.15 |
| 4,162,662 | 7/1979 | Melchior | 123/65 BA |
| 4,392,459 | 7/1983 | Chareire | 123/90.11 |
| 4,399,788 | 8/1983 | Bostelmann | 123/65 PE |
| 4,445,467 | 5/1984 | Westerman et al. | 123/65 R |
| 4,530,318 | 7/1985 | Semple | 123/90.17 |
| 4,616,605 | 10/1986 | Kline | 123/65 VD |
| 4,700,684 | 10/1987 | Pischinger et al. | 123/90.11 |
| 4,719,882 | 1/1988 | Kreuter | 123/90.11 |
| 4,732,118 | 3/1988 | Tanahashi et al. | 123/65 VD |
| 4,763,613 | 8/1988 | Arahata et al. | 123/65 PE |
| 4,829,945 | 5/1989 | Yamamoto et al. | 123/323 |
| 4,883,025 | 11/1989 | Richeson, Jr. | 123/90.11 |
| 4,920,932 | 5/1990 | Schlunke | 123/65 PE |
| 4,924,819 | 5/1990 | Boyesen | 123/65 PE |
| 4,993,372 | 2/1991 | Mott et al. | 123/65 VC |

FOREIGN PATENT DOCUMENTS

| | | | |
|---|---|---|---|
| 3143402 | 5/1983 | Fed. Rep. of Germany | 123/65 VD |
| 62-291427 | 12/1987 | Japan | 123/65 PE |
| 1-92522 | 4/1989 | Japan | 123/65 VC |
| WO87/07325 | 12/1987 | PCT Int'l Appl. | 123/65 VC |

*Primary Examiner*—David A. Okonsky
*Attorney, Agent, or Firm*—Robert J. Kraus

[57] ABSTRACT

A two-stroke-cycle spark ignited internal combustion engine operates with an exhaust valve that is controlled independently of crankshaft position and optimally for high power and low pollutant output in combination with a scavenging pump and fuel injector. The volume of combustible mixture is established at the point in the cycle when the exhaust valve is selectably closed with the piston traveling upwardly and decreasing the volume of the cylinder. Throttling losses are eliminated since the piston forces the scavenging air out of the cylinder through the wide-open exhaust valve rather than the air being drawn into the cylinder against the reduced pressure caused by a conventional partially closed throttle plate. The volume of combustible air in the cylinder is determined by the point in the cycle at which the exhaust valve is closed and a correspondingly appropriate charge of fuel is thereafter injected into the cylinder.

15 Claims, 7 Drawing Sheets

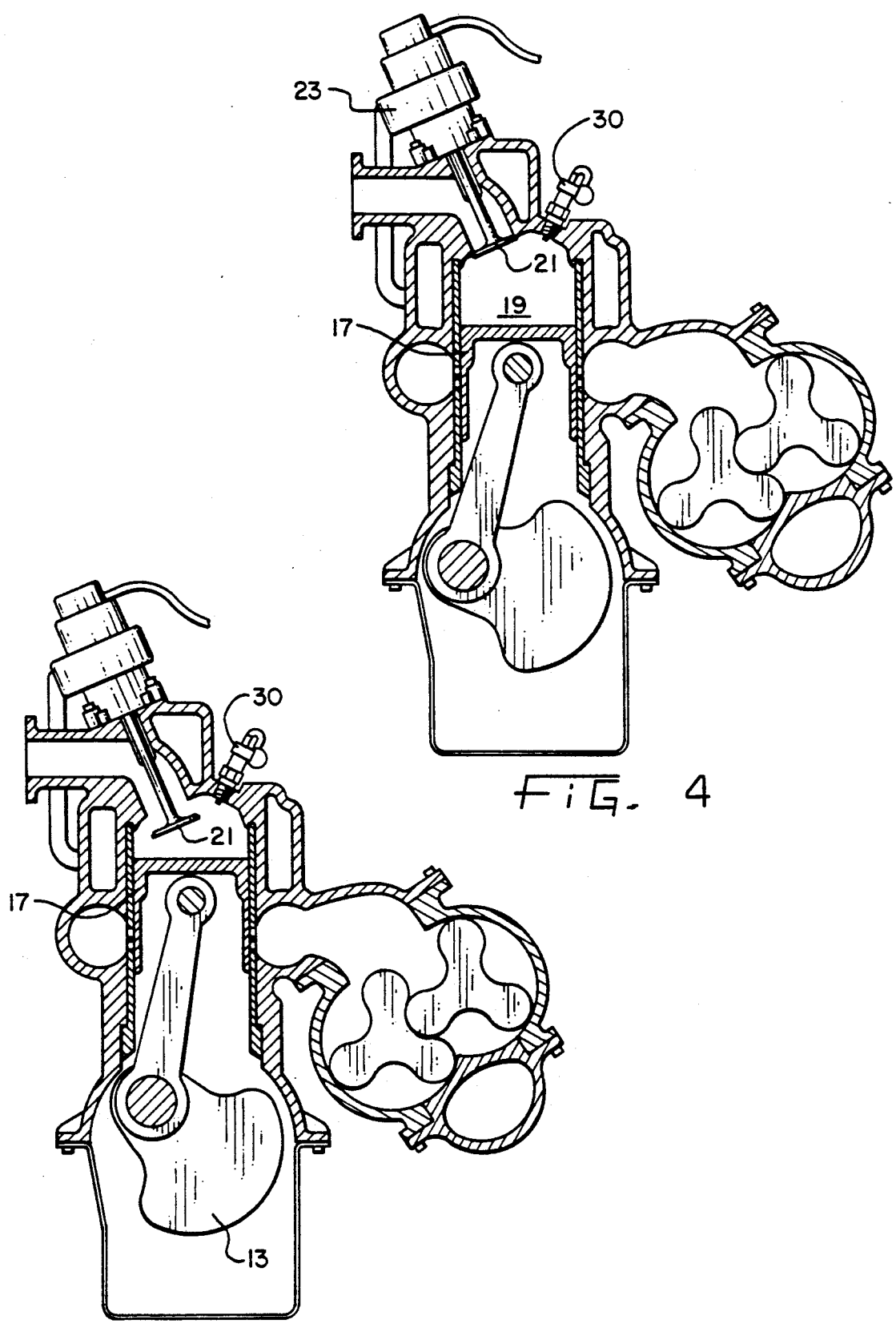

TWO-STROKE-CYCLE ENGINE WITH VARIABLE VALVE TIMING

SUMMARY OF THE INVENTION

The present invention relates generally to internal engines and more particularly to such internal combustion engines of the spark-ignited type and ones which operate in a two-stroke-cycle mode. Specifically, the present invention relates to variable timing of the valves, and particularly the exhaust valve, in such a two-stroke-cycle spark-ignited internal combustion engine.

Internal combustion engine valves in four-stroke cycle engines are almost universally of a poppet type which are spring loaded toward a valve-closed position and opened against that spring bias by a cam on a rotating cam shaft with the cam shaft being synchronized with the engine crankshaft to achieve opening and closing at fixed preferred times in the engine cycle. This fixed timing is a compromise between the timing best suited for high engine speed and the timing best suited to lower speeds or engine idling speed. The valves in two-stroke-cycle engines are generally simple apertures or ports in the cylinder sidewall which are uncovered or opened by piston movement, however, exhaust valving of the cam actuated as well as other varieties have been suggested.

A two stroke-cycle compression ignited (Diesel) engine utilizing a conventional cam actuated overhead valve as the exhaust valve with the traditional cylinder sidewall intake ports receiving pressurized scavenging air from a positive displacement (Roots) blower is know. The exhaust valving of this known Diesel engine suffers from the above defects, but when operated over a narrow range of speeds, it operates with relatively high efficiency since there are little or no throttling losses in its operation. It would be highly desirable to be able to operate a spark-ignited two-stroke-cycle engine over a wide range of speeds with little or no throttling losses, but up until now this has not been possible because such spark-ignited engines require a fuel to air ratio mix versus retained exhaust gas within a fairly narrow range of values for successful ignition. Control of such an engine, then, requires some measure of control over both the quantity of fuel entering the cylinder and a control of the quantity of air entering the cylinder as well as the quantity of retained exhaust gas. The control of the quantity of air entering the cylinder has, up until now, been controlled by a restriction or throttling of the air path into the cylinder against which piston motion had to work to suck the desired quantity of air into the cylinder. Such throttling has been so commonplace that the traditional name attached to the engine speed control in aircraft, boats, steam engines and many other craft is "throttle."

A two stroke-cycle spark-ignited engine utilizing a conventional ignition system and having a fuel injector which introduces a controlled quantity of fuel directly into the closed end of the cylinder cavity has also been proposed. This engine utilizes the traditional cylinder sidewall intake ports receiving pressurized scavenging air from a positive displacement blower and cylinder sidewall exhaust ports which, in addition to being opened and closed by piston travel, are valved by rotary exhaust valves. The exhaust valving of this known Otto cycle engine appear to be either chain or cam driven, but, in either case, appears to be fixed in its timing and to suffer from the above defects.

The prior art has recognized numerous advantages which might be achieved by replacing such cam actuated or similar valve arrangements with other types of valve opening mechanism which could be controlled in their opening and closing as a function of engine speed as well as engine crankshaft angular position or other engine parameters.

For example, in U.S. Pat. application Ser. No. 226,418 entitled VEHICLE MANAGEMENT COMPUTER filed in the name of William E. Richeson on July 29, 1988 there is disclosed a computer control system which receives a plurality of engine operation sensor inputs and in turn controls a plurality of engine operating parameters including ignition timing and the time in each cycle of the opening and closing of the intake and exhaust valves among others. This application teaches numerous operating modes or cycles in addition to the conventional four-stroke cycle. In particular, this application discloses the principles suitable for implementing a control computer for the two-stroke-cycle engine of the present invention.

In copending application Ser. No. 153,257, now U.S. Pat. No. 4,878,464, entitled PNEUMATIC ELECTRONIC VALVE ACTUATOR, filed Feb. 8, 1988 in the names of William E. Richeson and Frederick L. Erickson and assigned to the assignee of the present application there is disclosed a valve actuating device which is a jointly pneumatically and electromagnetically powered valve with high pressure air supply and control valving to use the air for both damping and as one motive force. A magnetic motive force is supplied from the magnetic latch opposite the one being released and this magnetic force attracts an armature of the device so long as the magnetic field of the first latch is in its reduced state. As the armature closes on the opposite latch, the magnetic attraction increases and overpowers that of the first latch regardless of whether it remains in the reduced state or not. This copending application also discloses different operating modes including delayed intake valve closure and a six stroke cycle mode of operation.

The forgoing as well as a number of other related applications all assigned to the assignee of the present invention and filed in the name of William E. Richeson or William E. Richeson and Frederick L. Erickson are summarized in the introductory portions of copending Ser. No. 07/294,728 filed in the names of Richeson and Erickson on Jan. 6, 1989 and entitled ENHANCED EFFICIENCY VALVE ACTUATOR. Any of the valve actuators disclosed in these applications may be advantageously utilized in implementing the two-stroke-cycle engine of the present invention.

The entire disclosures of all of the above identified copending applications are specifically incorporated herein by reference.

Among the several objects of the present invention may be noted the provision of a spark-ignited engine operable in a two-stroke-cycle mode without the throttling losses heretofor characteristic of such spark-ignited engines; the provision of a two-stroke-cycle spark-ignited engine having the advantages of a two-stroke-cycle diesel engine, but operable efficiently over a wide speed range, the provision of an engine in accordance with the previous object which may be incorporated into large vehicles to facilitate a reduction in the complexity of the transmissions thereof; the provision of an unthrottled spark-ignited engine; the provision of an engine having an exhaust valve which closes at a time in the engine cycle which is determined by the power demanded from the engine; the provision of a cleaner burning two-stroke-cycle engine as compared to most of the current two or four stroke engines currently available; and the provision of a unique control technique for a two-stroke-cycle internal combustion engine. These as well as other objects and advantageous features of the present invention will be in part apparent and in part pointed out hereinafter.

It has long been a goal in engine design to achieve a lean burn. Lean burns burn slowly and to get the most useful burn at a given RPM the ignition typically takes place at an early time during the compression stroke. Successful ignition depends on the air/fuel mix and the density and temperature of the ignition plasma. The lean burn achievable with the present two-stroke-cycle engine can be used to reduce emissions. Due to the stratified charge in the engine cylinder, a rapid lean burn followed by a rapid cooling of the combusted gases is possible. A more thorough burning can take place which will reduce unburned hydrocarbon and carbon monoxide emissions. The subsequent rapid cooling of the cylinder gas reduces the maximum burn temperature which in turn reduces NOX emissions.

Stratification of charge after a thorough purging of the combustion chamber of the present inventive engine yields further unsuspected advantages. The exhaust gases that are normally emitted near the end of the exhaust stroke are rich in unburned hydrocarbons due to scavenging effects of the unburned boundary layers close to the cooler combustion chamber walls and the boiling of unburned hydrocarbons out of cavities such as around the head gasket and around the piston and its compression rings that were deposited there due to pressurization of the charge due to the compression stroke and burning charge pressurization. With the present technique, it is fuel-free air which is compressed around the rings and piston head. Moreover, the air flow from the lowermost portion of the cylinder adjacent the head of the piston upwardly through the cylinder and out the exhaust valve in the dome of the cylinder head is highly effective in purging the cylinder of all the combustion products. These effects combine to reduce the likelihood of detonation at high compression ratios (knock) and therefore allow the use of lower octane fuels.

Therefore, further objects of the present invention are to provide an engine of reduced unburned hydrocarbon, NOX and carbon monoxide concentration in the exhaust; an engine which allows the utilization of reduced octane fuels; and such an engine which will go toward greatly reducing or eliminating the need for the catalytic converter.

In general, a method of operating a two-stroke-cycle internal combustion engine at a controlled fuel to air mixture ratio includes varying the time in the cycle at which an exhaust valve is closed under varying load conditions and correspondingly varying the quantity of fuel introduced into the engine so as to maintain the controlled ratio of fuel to air in the combustion chamber at the time of ignition. Typically the exhaust valve is open longer during each cycle under reduced load conditions and is closed at a time in the cycle to entrap a quantity of air appropriate to operation at a desired engine speed. An amount of fuel appropriate to that desired engine speed is subsequently introduced into the entrapped quantity of air.

Also in general and in one form of the invention, a method of operating a spark-ignited internal combustion engine includes injecting fuel into a cylinder of the engine at a time in the engine cycle which varies with the demand placed on the engine, however, this injection of fuel is always a fixed rotational increment after closure of the cylinder exhaust valve or that same fixed rotational increment after closure of the cylinder intake port whichever is later in the cycle. The quantity of fuel to be ingested into the engine is selected in accordance with the time at which the exhaust valve is closed so as to maintain a desired fuel to air ratio. Supercharging of the combustion air as it enters an engine cylinder may be achieved by maintaining a relatively constant pressure air source at a cylinder inlet and opening that cylinder inlet a fixed percentage of each engine cycle; and closing an exhaust valve of the cylinder at any selected time while the intake valve is open.

BRIEF DESCRIPTION OF THE DRAWING

FIG. 4 is a view similar to FIG. 1, but showing the piston 75 degrees before top center;

FIG. 5 is a view similar to FIG. 1, but showing the piston 45 degrees before top center;

Corresponding reference characters indicate corresponding parts throughout the several views of the drawing.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Figure 1A:
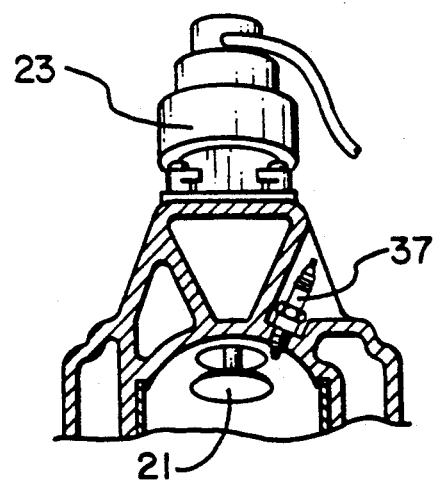
FIG. 1a is a cross-sectional view of the upper portion of the cylinder of FIG. 1 in a plane orthogonal to the plane of FIG. 1.
Figure 1:
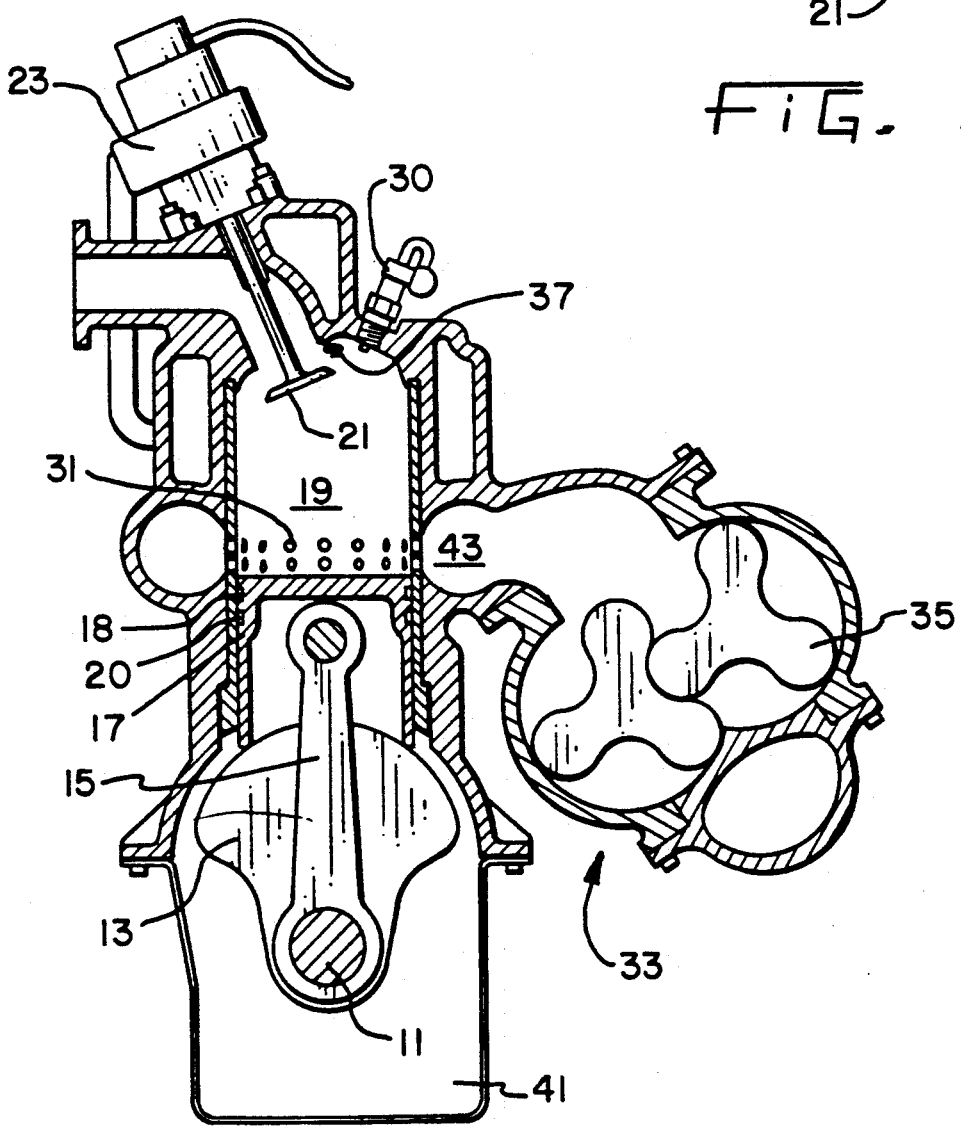
FIG. 1 is a cross-sectional view through one engine cylinder with the piston in its lowermost or bottom dead center position and illustrating the invention in one form.

Referring first to FIG. 1, a two-stroke-cycle internal combustion engine has a crankshaft 11 with conventional counterbalancing 13 and connecting rod 15 coupled to a piston 17. While only one cylinder 19 is illustrated in FIG. 1, it will be understood that each cylinder of a typically multi-cylinder engine has common features such as an exhaust poppet valve 21 for each cylinder of the engine along with a valve actuator 23 which is operable on a first command as from a computer control 25 (FIG. 16) to open the cylinder poppet valve as well as being operable on a second command to close a cylinder poppet valve. The computer control selectively determines the time of occurrence of the second command in accordance with a desired engine output characteristic. The two-stroke-cycle internal combustion engine will typically be operated at a controlled fuel to air mixture ratio by varying the time in the cycle at which the exhaust valve 21 is closed under varying load conditions as determined by vehicle 27 and operator 29 inputs, and correspondingly varying the quantity of fuel introduced into the engine by fuel injectors such as 30 and 32 located in the engine head so as to maintain the controlled ratio of fuel to air in the piston or combustion chamber 19 at the time of ignition. Typically, the exhaust valve will be open longer and, therefore, a lesser quantity of air will be retained in the cylinder during each cycle under reduced load conditions. Thus, the time or rotational position in the cycle at which the exhaust valve should be closed to trap an optimum quantity of air for a given engine power level is first determined and then the quantity of fuel to be ingested is selected accordingly to maintain a desired combustible fuel to air ratio.

Each combustion chamber or cylinder 19 has a series of openings 31 which are selectively opened and closed by piston motion. These openings 31 communicate with a source of pressurized combustion air 33 such as a positive displacement pump 35 which is coupled to the holes 31. The holes function as an intake port for supplying air to the cylinder while the piston 17 is in a position (down as viewed) to open this intake port. As shown, sump 41 is an actual oil sump for lubricating the engine bearings, but it may, in relatively small engines, provide the function of pumping air into the cylinder on the down stroke of the piston as is known in two-stroke-cycle engines if desired.

Figure 2:
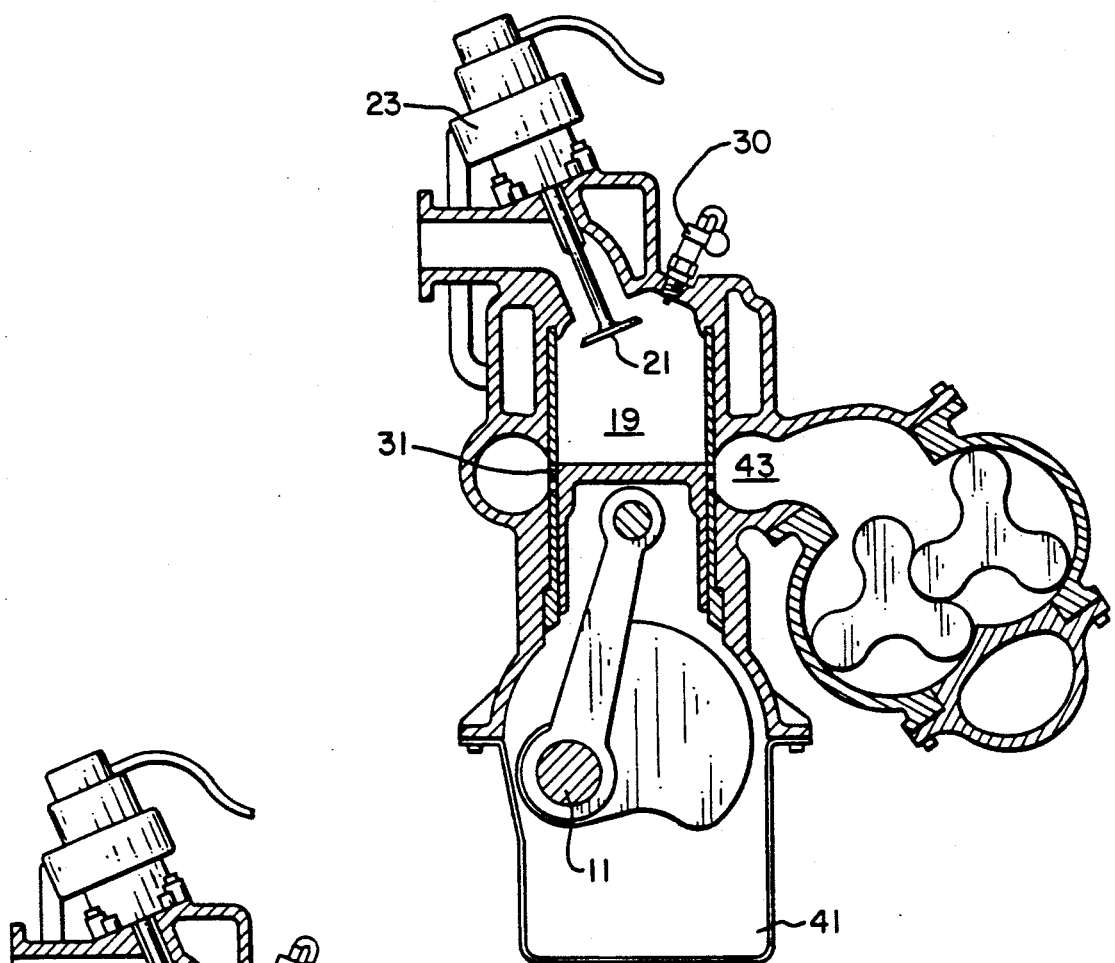
FIG. 2 is a view similar to FIG. 1, but showing the piston after it has moved upward just sufficiently to close the air intake ports in the cylinder sidewalls.

Precise control of the time of opening and closing of the illustrative exhaust valve 21 by valve actuator 23 allows attainment of the lofty goals of the present invention. FIG. 1 illustrates the engine mechanism at bottom center with the crankshaft 11 turning clockwise as viewed. At this point in the cycle, the intake ports 31 are wide open and the cylinder or combustion chamber 19 is being scavenged of the exhaust gases by a Roots type positive displacement blower 35. The scavenging (fresh) air enters the lower ports 31 which extend about the periphery of the cylinder sidewall and sweeps upwardly through the cylinder and carries these gases out through the exhaust port of the open exhaust valve 21. If high power at low speed is desired, the exhaust valve 21 may be closed with the piston 17 close to bottom dead center. This will allow the maximum entrapment of fresh air and some supercharging while the inlet ports 31 are still open. If high power at high speed is desired, the exhaust valve 21 may be closed when the piston has just covered the intake (inlet) ports 31, i.e., the piston position of FIG. 2. At this point, the scavenging is completed at high speed and the entrapped air will occupy all of the cylinder volume above the inlet ports. Once the exhaust valve 21 has closed, the fuel injector 30 will fire a proportionate amount of atomized fuel into the cylinder. The time of such fuel injection is shown by an * in FIGS. 10-15 and occurs generally at a point in the engine cycle which varies with the demand placed on the engine yet always a fixed rotational increment after closure of the cylinder exhaust valve or that same fixed rotational increment after closure of the cylinder intake port whichever is later in the cycle. Thus, in FIGS. 10, 11 and 12, the low torque conditions, fuel injection occurs a fixed angle after the exhaust valve closes while for the high torque conditions of FIGS. 13-15 the fixed angle is after closure of the intake port. The time of ignition on the other hand is a nearly constant angle prior to top dead center as shown by the O with some spark advance occurring with increasing engine speed.

The time in the cycle at which an exhaust valve is closed under varying load and engine speed conditions and therefore also the quantity of fuel introduced into the engine combustion chamber are both varied so as to maintain a desired ratio of fuel to air in the combustion chamber at the time of ignition. Generally speaking, the exhaust valve is open longer during each cycle under reduced load conditions. The exhaust valve is closed at a point in the cycle to entrap a quantity of air appropriate to operation at a desired engine speed and an amount of fuel appropriate to that desired engine speed is subsequently introduced into the entrapped quantity of air. The amount of atomized fuel injected into the cylinder is selected, as determined at least in part by the time of closing of the exhaust valve, to always provide a controlled air/fuel ratio to the combustion chamber. If lower power is desired, the exhaust valve is simply left open longer to allow the piston to push more air out of the exhaust port so that when the exhaust valve does close a smaller volume of air is entrapped. A correspondingly smaller volume of fuel is then injected.

Figure 3:
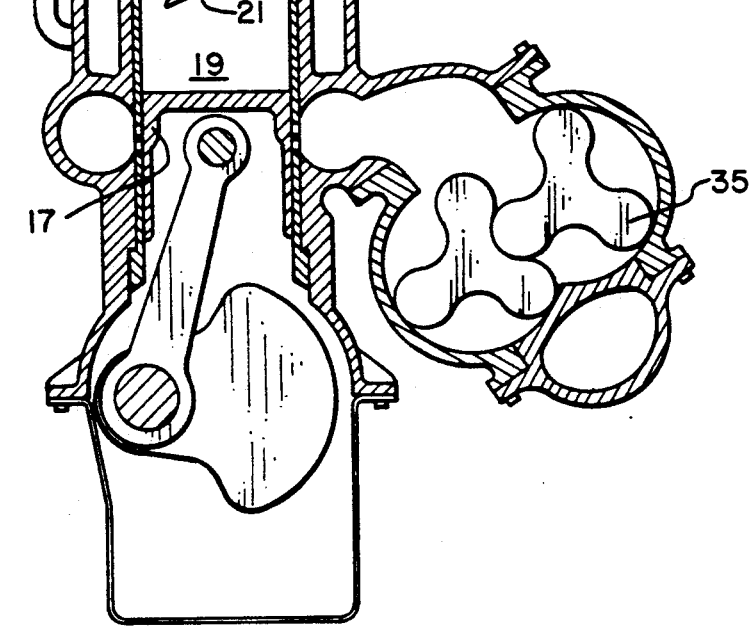
FIG. 3 is a view similar to FIG. 1, but showing the piston 90 degrees before top center.
Figure 6:
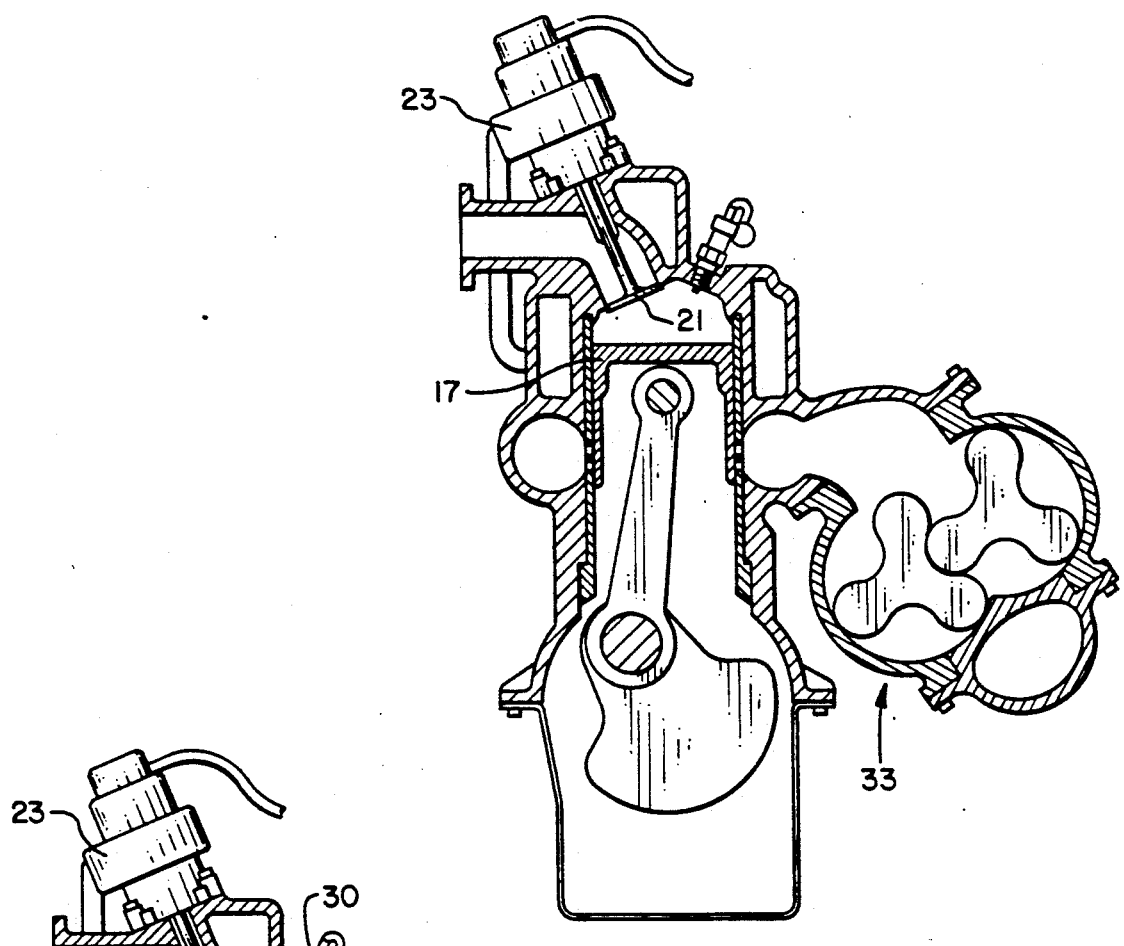
FIG. 6 is a view similar to FIG. 1, but showing the piston 30 degrees before top center.

FIG. 3 illustrates a point at which the exhaust valve is just beginning to close with FIG. 4 showing that closure completed. The air entrapped above the piston in FIG. 4 results in a somewhat medium power condition. In comparing FIGS. 4 and 5, it will be noted that the valve 21 has been retarded in FIG. 5 so as to close later in the cycle when the piston 17 has traveled upwardly expelling additional air. FIG. 5 illustrates the condition where very low power or close to idle conditions are required. FIGS. 5 and 6 span this low power condition with FIG. 6 showing completion of valve closure. A very small amount of air will be entrapped above the piston of FIG. 6. It should be noted that during the entire air induction process and the precise metering of entrapped air by ejecting air through the exhaust port until that valve closes, there has been a total absence of throttling, hence, a total absence of throttling losses. Because the exhaust valve may be closed at selectable times, a moderate compression spark ignited engine having the nearly zero throttling losses heretofor attainable only with certain types of compression ignition engines is now possible.

Figure 7:
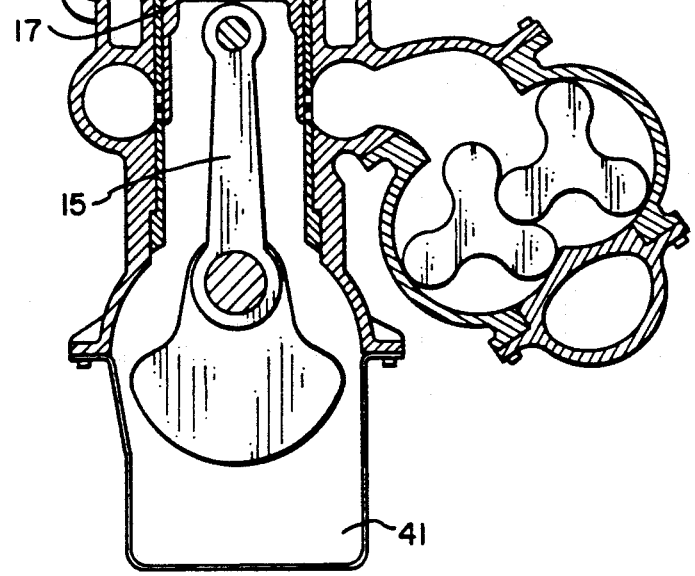
FIG. 7 is a view similar to FIG. 1, but showing the piston at top center.
Figure 8:
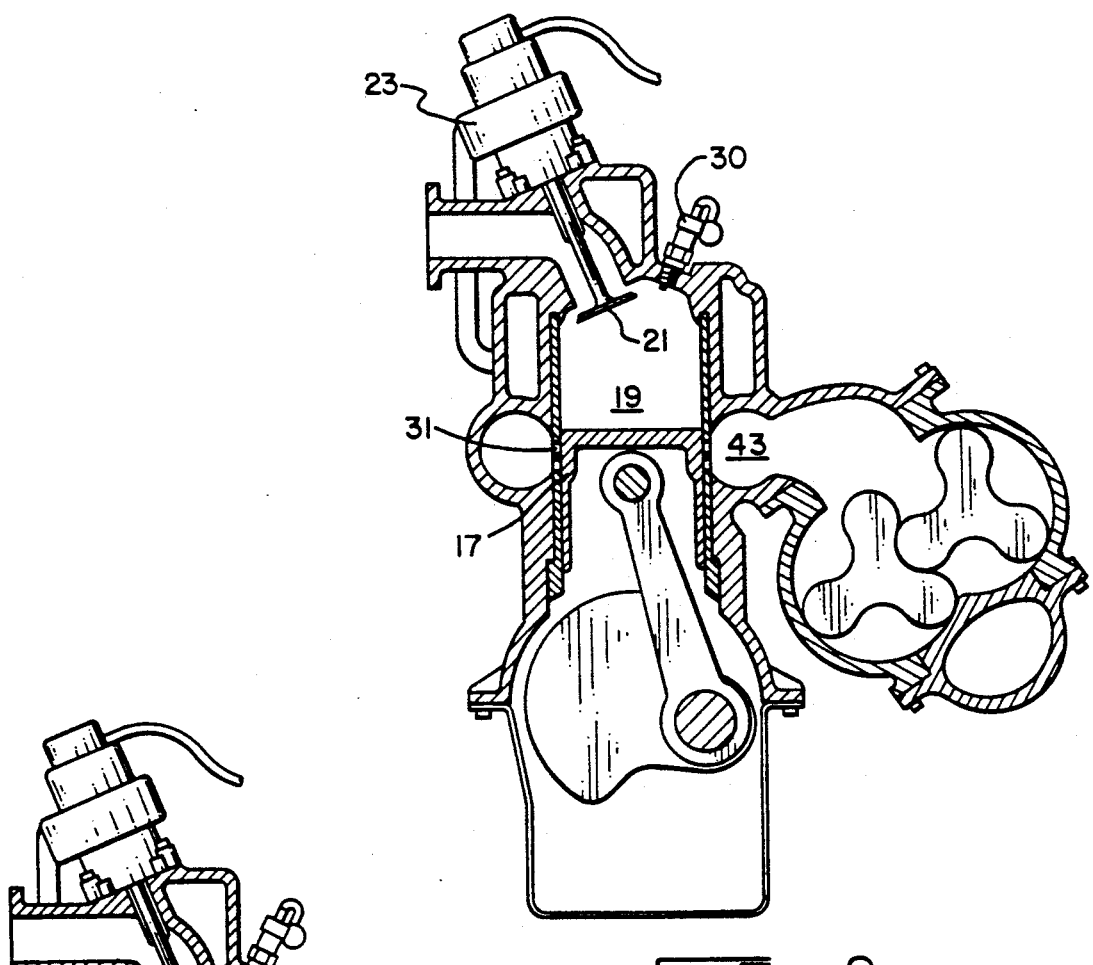
FIG. 8 is a view similar to FIG. 1, but showing the piston beyond top center and about to uncover the cylinder sidewall inlet ports.
Figure 9:
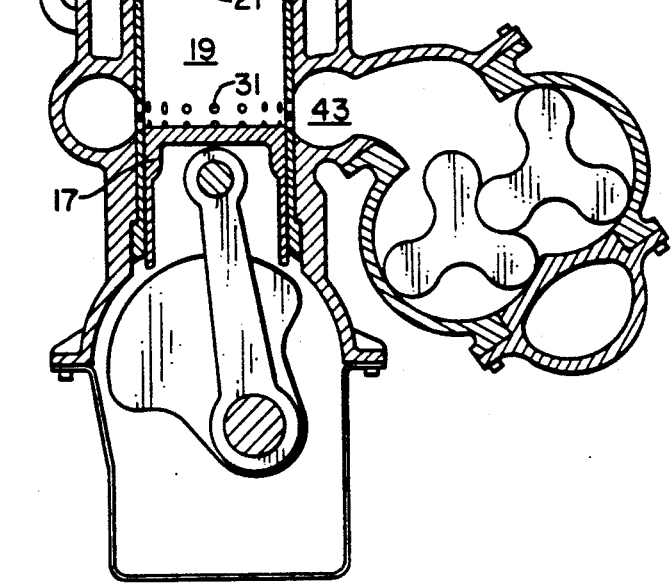
FIG. 9 is a view similar to FIG. 1, but showing the piston beyond top center just after it has uncovered the cylinder sidewall inlet ports.

FIG. 7 shows the piston at top dead center position just after ignition. FIG. 8 shows the piston returning downwardly to a typical location where the exhaust valve is reopened to allow exhaust blowdown to substantially atmospheric pressure in the combustion chamber (or at least to a pressure below that of the fresh air at the intake ports) prior to the opening of those intake ports as shown in FIG. 9.

Figure 10:
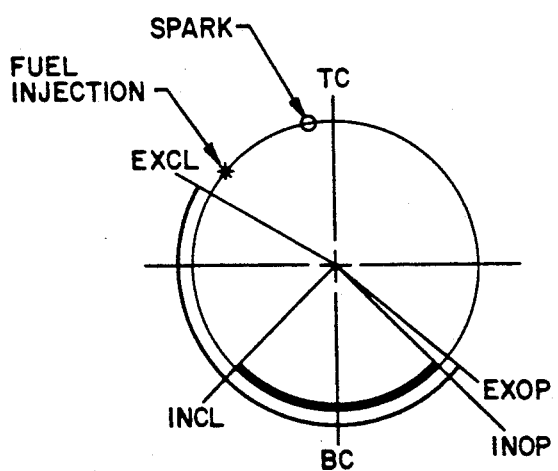
FIG. 10 is an illustrative engine timing diagram for the engine of FIGS. 1-9 for a low torque, low speed condition.
Figure 11:
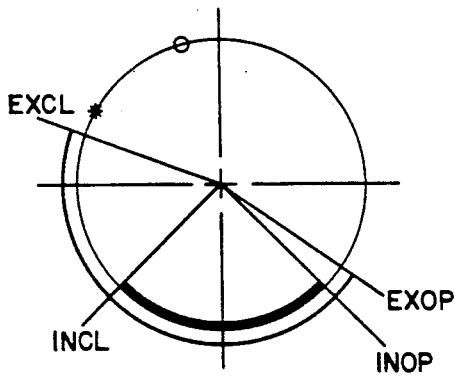
FIG. 11 is an illustrative engine timing diagram similar to FIG. 9, but for a low torque, medium speed condition.
Figure 12:
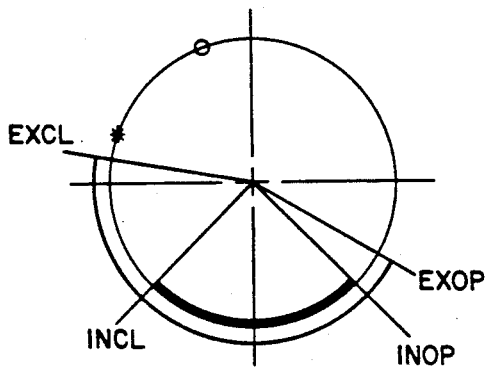
FIG. 12 is an illustrative engine timing diagram similar to FIG. 9, but for a low torque, high speed condition.

The engine management computer 25 may select the timing angle at which the exhaust valve opens and the angle at which it closes giving the engine of the present invention a wide range of operational flexibility. The timing diagrams of FIGS. 10-12 illustrate slightly different points at which the exhaust valve opens (EXOP) and closes (EXCL) with that valve closing progressively earlier in the cycle as the engine speed increases from 500 RPM for FIG. 10, 1500 RPM for FIG. 11 to 4500 RPM for FIG. 12. The EXCL points determine three specific volumes which will yield three different power levels with the power level being proportional to the amount of air entrapped by valve closure. Late closing, of course, corresponds to relatively small quantities of air and light torque conditions. The exhaust valve is opened (EXOP) in all six timing diagrams progressively earlier as engine speed increases. Note in these same figures the opening of the exhaust valve varies to maximize the expansion ratio and efficiency as well as to optimize exhaust evacuation. Opening timing should be such that the cylinder pressure at the time the intake air ports opens should be equal to or lower than the intake air pressure.

Figure 13:
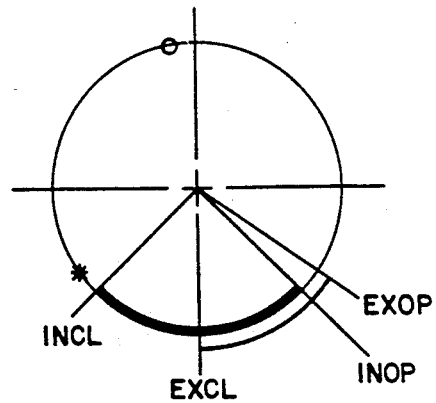
FIG. 13 is an illustrative engine timing diagram similar to FIG. 9, but for a high torque, low speed condition.

FIGS. 10 and 13 illustrate that at low speed the angle between the exhaust valve opening and inlet air opening (INOP) can be set very close to one another because the combustion chamber has more time due to the slow speed condition to blow down to the inlet port pressure at 43. At high operational speeds as shown in FIG. 12 and 15, the angular lead of the exhaust valve opening prior to the inlet being uncovered must be greater to allow sufficient time for the exhaust pressure to blow down to the inlet blower pressure.

Figure 14:
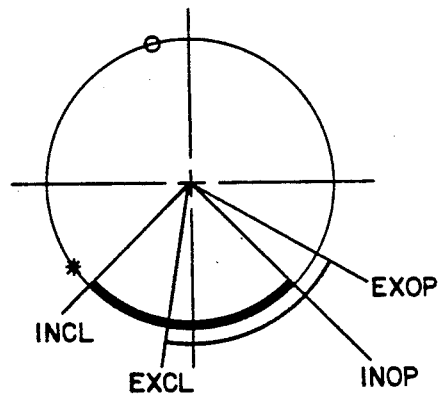
FIG. 14 is an illustrative engine timing diagram similar to FIG. 9, but for a high torque, medium speed condition.
Figure 15:
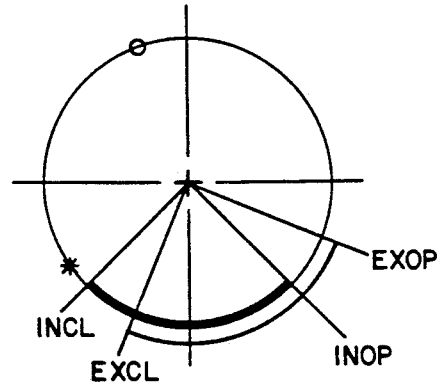
FIG. 15 is an illustrative engine timing diagram similar to FIG. 9, but for a high torque, high speed condition.

FIGS. 13-15 show high torque conditions as the engine speed increases from 500 RPM for FIG. 13, 1500 RPM for FIG. 14 to 4500 RPM for FIG. 15. FIG. 13 illustrates that the exhaust valve can be closed as early as bottom center since there is adequate time for the scavenging function at low engine speed. Between the time the exhaust valve closes and the time the inlet valve closes (INCL) pump 35 is forcing air under pressure into combustion chamber 19 causing a certain amount of supercharging. FIGS. 14 and 15 are illustrative of high torque at mid and high speed conditions respectively. Note that as the engine speed increases so also does the angle between the opening of the exhaust valve and the opening of the inlet port. For fixed inlet port timing, the exhaust valve is opened progressively earlier with increasing speed in order to allow sufficient time for exhaust pressure to blow down to the inlet port pressure. Similarly, as the speed increases, the exhaust valve remains open longer to allow the blower to force all the combustion gases from the combustion chamber.

Figure 16:
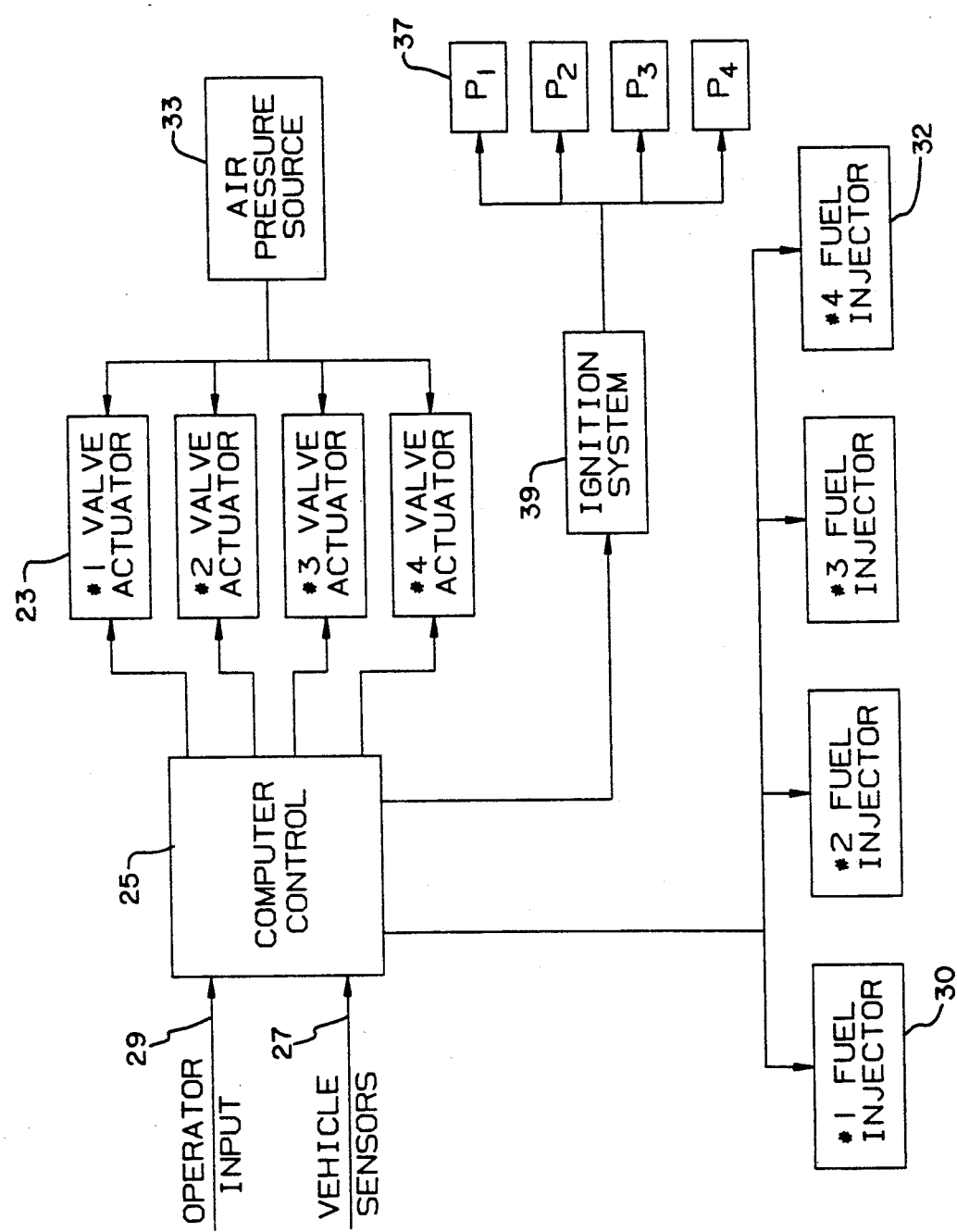
FIG. 16 is a schematic illustration of a computer control for an illustrative four cylinder engine.

As is clear from an inspection of FIG. 16, the illustrative cylinder of FIGS. 1-9 will frequently be in a two-stroke-cycle engine having a multiplicity of pistons reciprocable in respective cylinders wherein the cycle for each cylinder has intake, exhaust and compression segments as depicted in FIGS. 10-15. Moreover, such a multicylinder engine will have an arrangement which includes at least one exhaust valve for each said cylinder that is opened and closed by a respective valve actuator to obtain means for adjusting each of said exhaust segments to provide a compression ratio in each of said cylinders which has a predetermined relationship to engine torque and speed. As shown in FIGS. 10-15, the compression ratio for low torque is significantly lower than that for high torque and the compression ratio for low speed is less than for high speed. Moreover, the vehicle computer 25 senses the engine torque and speed demands and provides control signals to each said valve actuator to cause said actuator to open and close its respective valve to obtain said compression ratios. The computer functions as a control means in response to engine load and engine speed to vary the exhaust segment of the cycle accordingly for opening the exhaust valve prior to the intake segment of the cycle and closing the exhaust valve at the completion of the exhaust segment whereby a sufficient charge of air is admitted into the cylinder to have substantially purged the cylinder of the burned gases from the previous ignition segment of the cycle and to introduce substantially clean air into said cylinder.

Each cylinder of such a two-stroke-cycle engine will typically have a piston 17 with a plurality of piston rings such as 18 and 20 reciprocable in the closed ended cylinder 19 and the typical cycle will have intake, exhaust, compression and ignition segments. Each cylinder will have a fuel injector 30 located near the closed end to admit fuel into the cylinder after the exhaust segment of the cycle as well as a spark igniter 37 located near the closed end. The intake port or ports 31 are located in the cylinder sidewall and the pump 35 supplies a charge of pressurized air through the intake port 31 into the cylinder 19 during the intake segment of the cycle. The spark igniter 37 is energized after the fuel injector 30 has admitted fuel into the cylinder to provide in concert with the exhaust segment stratified fuel/air layers in said cylinder with the richest fuel/air layer near the upper closed end of the cylinder and progressively less rich fuel/air layers away from the closed end toward the piston 17 with a layer of predominantly fresh air covering the piston and piston rings 18 and 20 whereby the piston and piston rings are cleansed of previously burned gases and the combustion gases are quickly cooled by the progressively less rich and fresh air layers and the fresh air layer mixes quickly with the already ignited richer fuel/air layers due to the gaseous turbulence caused by the extreme temperature gradient after ignition to minimize hydrocarbon and NOX pollutants in the cylinder exhaust gases.

The overall control system for the present two-stroke-cycle engine employs substantially the same principles as disclosed in the abovementioned U.S. Pat. application Ser. No. 226,418 entitled VEHICLE MANAGEMENT COMPUTER, but differs therefrom in utilizing but a single valve actuator for each engine cylinder. Such a system is shown schematically in FIG. 16. The control computer 25 receives operator demand input signals on line 29 and input information on the current operation of the engine such as engine speed (RPM) on line 27. A source of high pressure air 33 is provided for powering the valve actuators such as 23 which may, for example, be of any one of the types summarized in the abovementioned ENHANCED EF- FICIENCY VALVE ACTUATOR. The computer also issues commands for actuating the fuel injectors such as 30 and 32 and the ignition system 39. As shown in FIG. 16, there is one valve actuator, one fuel injector and one spark plug such as 37 for each one of four different engine cylinders.

From the foregoing, it is now apparent that a novel two-stroke-cycle engine as well as a novel arrangement for varying the time of opening and closing an exhaust valve in such a two-stroke-cycle engine have been disclosed meeting the objects and advantageous features set out hereinbefore as well as others, and that numerous modifications as to the precise shapes, configurations and details may be made by those having ordinary skill in the art without departing from the spirit of the invention or the scope thereof as set out by the claims which follow.

What is claimed is:

1. The method of operating a two-stroke-cycle internal combustion engine, having a two-stroke engine cycle, at a controllable fuel to air mixture ratio comprising varying the time in the cycle at which an exhaust valve is closed under varying load and engine speed conditions and correspondingly varying the quantity of fuel introduced into the engine combustion chamber so as to maintain a desired ratio of fuel to air in the combustion chamber at the time of ignition, the exhaust valve being closed at a time in the cycle to entrap a quantity of air appropriate to operation at a desired engine speed and an amount of fuel appropriate to that desired engine speed being subsequently introduced into the entrapped quantity of air.

2. The method of operating a two-stroke-cycle internal combustion engine of claim 1 wherein the exhaust valve is open longer during each cycle under reduced load conditions.

3. The method of operating a two-stroke-cycle internal combustion engine, having a two-stroke engine cycle, with a selectable combustible charge which charge is proportional to the torque demand on the engine by varying the time in the cycle at which an exhaust valve closes, the exhaust valve being closed earlier in the cycle for high torque demand and closed later in the cycle for reduced torque demand.

4. The method of claim 3 including the additional step of selecting the quantity of fuel to be ingested into the engine in accordance with the time at which the exhaust valve is closed so as to maintain a desired fuel to air ratio.

5. In a two-stroke-cycle spark ignited engine, having a two-stroke engine cycle, and having a piston reciprocable in a cylinder, said cylinder having an inlet port and said cycle having intake, exhaust and compression segments; and a spark igniter for igniting a combustible mixture in the cylinder during the compression segment of the cycle, the improvement comprising:

first means for compelling air under charging pressure through said inlet port into said cylinder during said intake segment; and second means comprising at least one exhaust valve for said cylinder that is opened and closed by a valve actuator independently of engine crankshaft position for exhausting air from said cylinder during said exhaust segment of the cycle which exhaust segment overlaps at least a portion of said intake segment whereby motion of said piston in said cylinder is substantially free of any throttling vacuum thereby increasing engine efficiency.

6. The improvement of claim 5 wherein said second means includes control means for providing control signals to said valve actuator to cause said actuator to open and close said valve to obtain said increased efficiency.

7. In a two-stroke-cycle engine, having a two-stroke engine cycle, and having a piston reciprocable in a cylinder wherein the cycle has intake, exhaust and compression segments, the improvement comprising:

first means for adjusting said exhaust segment to provide a compression ratio in said cylinder which has a predetermined relationship to engine torque and speed, the compression ratio for low torque being significantly lower than that for high torque and the compression ratio for low speed being less than for high speed; and second means for admitting fuel to said cylinder during said compression segment.

8. The improvement of claim 7 wherein said first means includes at least one exhaust valve for said cylinder that is opened and closed by a valve actuator to obtain said compression ratios independently of engine crankshaft position.

9. The improvement of claim 8 wherein said first means includes means for sensing engine torque and speed demands and for providing control signals to said valve actuator to cause said actuator to open and close said valve to obtain said compression ratios.

10. In a two-stroke-cycle spark ignited engine, having a two-stroke engine cycle, and having a multiplicity of pistons reciprocable in respective cylinders, each cylinder having an inlet port and said cycle having intake, exhaust and compression segments; and spark igniters for igniting a combustible mixture in the respective cylinders during the respective compression segment of the cycle, the improvement comprising:

first means for compelling air under charging pressure through said inlet ports into each of said cylinders during respective intake segments;

second means for exhausting air from said cylinder during respective exhaust segments of the cycle which exhaust segments overlay at least a portion of the corresponding intake segment whereby motion of said piston in said cylinder is substantially free of any throttling vacuum thereby increasing engine efficiency, said second means comprising at least one exhaust valve for each of said cylinders that is opened and closed by a respective valve actuator independently of engine crankshaft position; and control means for providing control signals to said valve actuator to cause said actuator to open and close the corresponding at least one valve to obtain said increased efficiency.

11. In a two-stroke-cycle engine, having a two-stroke engine cycle, and having a multiplicity of pistons reciprocable in respective cylinders wherein the cycle for each cylinder has intake, exhaust and compression segments, the improvement comprising:

first means for adjusting each of said exhaust segments to provide a compression ratio in each of said cylinders which has a predetermined relationship to engine torque and speed, the compression ratio for low torque being significantly lower than that for high torque and the compression ratio for low speed being less than for high speed; and second means of admitting fuel to each of said cylinders during said compression segment.

12. The improvement of claim 11 wherein said first means includes at least one exhaust valve for each said cylinder that is opened and closed by a respective valve actuator to obtain said compression ratios independently of engine crankshaft position, and means for sensing engine torque and speed demands and for providing control signals to each said valve actuator to cause said actuator to open and close its respective valve to obtain said compression ratios.

13. A two-stroke-cycle engine, having a two-stroke engine cycle, and having a piston with a plurality of piston rings reciprocable in a closed ended cylinder; said cycle having intake, exhaust, compression and ignition segments, the engine comprising:
- a fuel injector located near the closed end of the cylinder;
- a spark igniter located near the closed end of the cylinder;
- at least one intake port located in the cylinder sidewall;
- means for supplying a charge of pressurized air through the intake port into the cylinder during the intake segment of the cycle;
- at least one exhaust valve located near the closed end of the cylinder;
- control means responsive to engine load and engine speed to vary the exhaust segment accordingly for opening the exhaust valve prior to the intake segment of the cycle and closing the exhaust valve at the completion of the exhaust segment whereby a sufficient charge of air has been admitted into said cylinder to have substantially purged said cylinder of the burned gases from the previous ignition segment of the cycle and to introduce substantially clean air into said cylinder;
- means to admit fuel into the cylinder through the fuel injector after the exhaust segment of the cycle;
- means for energizing said spark igniter after said fuel injector has admitted fuel into said cylinder to provide in concert with the exhaust segment stratified fuel/air layers in said cylinder with the richest fuel/air layer near the closed end of the cylinder and progressively less rich fuel/air layers away from the closed end toward the piston with a layer of predominantly fresh air covering the piston and piston rings whereby the piston and piston rings are cleansed of previously burned gases and the combustion gases are quickly cooled by the progressively less rich and fresh air layers and the fresh air layer mixed quickly wit the already ignited richer fuel/air layers due to the gaseous turbulence caused by the extreme temperature gradient after ignition to minimize hydrocarbon and NOX pollutants in the cylinder exhaust gases.

14. The two-stroke-cycle engine of claim 13 wherein said control means comprises a valve actuator for opening and closing of said exhaust valve upon opening and closing signals as determined from engine parameters including engine load and engine RPM.

15. The method of operating a two-stroke-cycle internal combustion engine, having a two-stroke engine cycle, comprising the steps of initiating exhaustion of gaseous fluid from the engine combustion chamber; admitting air to the combustion chamber; terminating exhaustion from the combustion chamber to provide a predetermined compression ratio that varies with engine load and engine RPM whereby the compression ratio for low torque is significantly lower than that for high torque and the compression ratio for low RPM is less than that for high RPM; and admitting fuel to the combustion chamber subsequent to terminating exhaustion.

* * * * *